US012684331B2

(12) United States Patent
Park

(10) Patent No.: US 12,684,331 B2
(45) Date of Patent: Jul. 14, 2026

(54) METHOD AND APPARATUS FOR MANAGING USER CONSENT FOR ROAMING UE IN WIRELESS COMMUNICATION SYSTEM

(71) Applicant: SAMSUNG ELECTRONICS CO., LTD., Suwon-si (KR)

(72) Inventor: Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/477,411

(22) Filed: Sep. 28, 2023

(65) Prior Publication Data

US 2024/0114332 A1 Apr. 4, 2024

(30) Foreign Application Priority Data

Sep. 30, 2022 (KR) ........................ 10-2022-0125629

(51) Int. Cl.
*H04L 41/14* (2022.01)
*H04W 8/08* (2009.01)
*H04W 8/18* (2009.01)
*H04W 84/04* (2009.01)

(52) U.S. Cl.
CPC ............. *H04W 8/183* (2013.01); *H04W 8/08* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2022/0039046 A1* | 2/2022 | Ianev | .................... H04W 60/00 |
| 2022/0295388 A1 | 9/2022 | Edge et al. | |
| 2022/0337486 A1* | 10/2022 | Hong | .................... H04L 41/024 |
| 2023/0345244 A1 | 10/2023 | Kim et al. | |

FOREIGN PATENT DOCUMENTS

| | | |
|---|---|---|
| KR | 10-2021-0144535 A | 11/2021 |
| WO | 2022059987 A1 | 3/2022 |
| WO | 2022173258 A1 | 8/2022 |

OTHER PUBLICATIONS

International Search Report and Written Opinion of the International Searching Authority dated PCT/KR2023/014666, in connection with International Application No. Dec. 28, 2023, 10 pages.
3GPP TR 23.700-81 V1.0.0 (Sep. 2022) Technical Report; 3rd Generation Partnership Project; Technical Specification Group Services and System Aspects; Study of Enablers for Network Automation for 5G 5G System (5GS); Phase 3 (Release 18); 258 pages.

(Continued)

*Primary Examiner* — Gary Lafontant

(57) ABSTRACT

The present disclosure relates to 5G communication techniques and systems for supporting higher data transmission rates after 4G systems. The present disclosure proposes a method of managing user consent information for a roaming UE and may be applied to a situation in which a communication operator intends to collect and utilize user data for purposes such as performance improvement.

14 Claims, 5 Drawing Sheets

(56)　　　　　　　References Cited

OTHER PUBLICATIONS

Samsung, "Update on Solution #40", S2-2206936, 3GPP TSG SA WG2 Meeting #152-e, Aug. 2022, 5 pages.

Huawei et al., "KI#3, Sol#37: Update to remove some FFS", S2-2206129, 3GPP TSG SA WG2 Meeting #152-e, Aug. 2022, 5 pages.

Vivo et al., "KI#3, Solutions evaluation and interim conclusion", S2-2206414, 3GPP TSG SA WG2 Meeting #152-e, Aug. 2022, 3 pages.

Supplementary European Search Report dated Oct. 30, 2025, in connection with European Patent Application No. 23873027.9, 11 pages.

* cited by examiner

METHOD AND APPARATUS FOR MANAGING USER CONSENT FOR ROAMING UE IN WIRELESS COMMUNICATION SYSTEM

CROSS REFERENCE TO RELATED APPLICATION

This application is based on and claims priority under 35 U.S.C. § 119 to Korean Patent Application No. 10-2022-0125629, which was filed in the Korean Intellectual Property Office on Sep. 30, 2022, the entire disclosure of each of which is incorporated herein by reference.

BACKGROUND

1. Field

The present disclosure relates to a wireless communication system, and a method and apparatus for acquiring and managing user consent information for a roaming UE in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies, referred to as Beyond 5G systems, in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting various numerologies (e.g., operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for ensuring coverage in an area in which communication with terrestrial networks is unavailable, position measurement (positioning), and the like.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (e.g., service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

User consent to data collection is required in order for a wireless communication system to collect and utilize user data to improve service performance and optimize operation performance. Meanwhile, in case that a UE performs roaming to another operator network, an effective method of processing user consent to data transfer between the networks in addition to the user consent to data collection for each of the networks.

The present disclosure for solving the above-mentioned problems is characterized by a method of acquiring user consent and providing the user consent to a selected roaming network during a roaming contract process of a UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a structure of a wireless communication system according to an embodiment of the present disclosure.

FIG. 2 illustrates a schematic operation of the wireless communication system for processing user consent to data collection and provision for a roaming UE according to the embodiment of the present disclosure.

DETAILED DESCRIPTION

Figure 1:
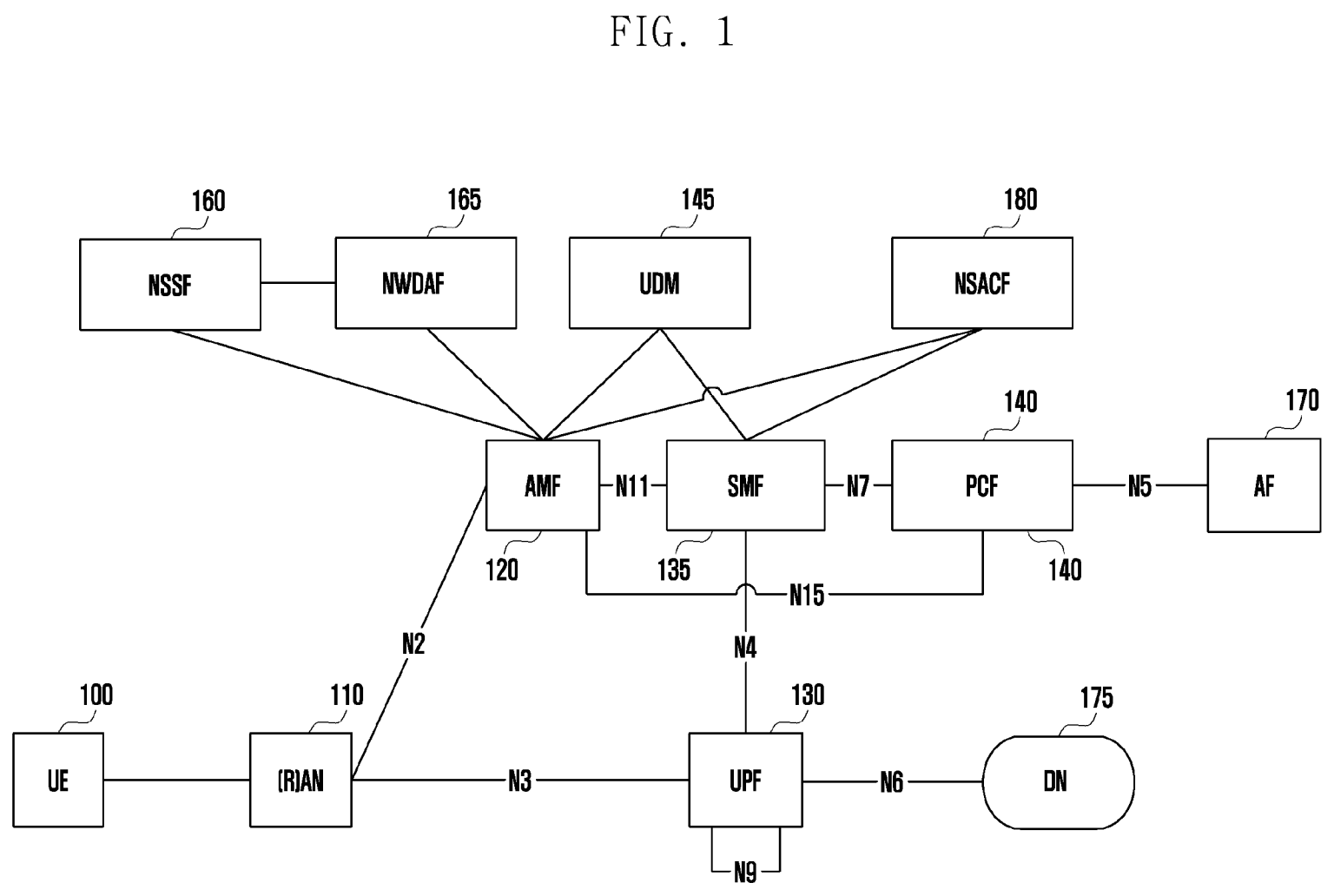
Figure 3:
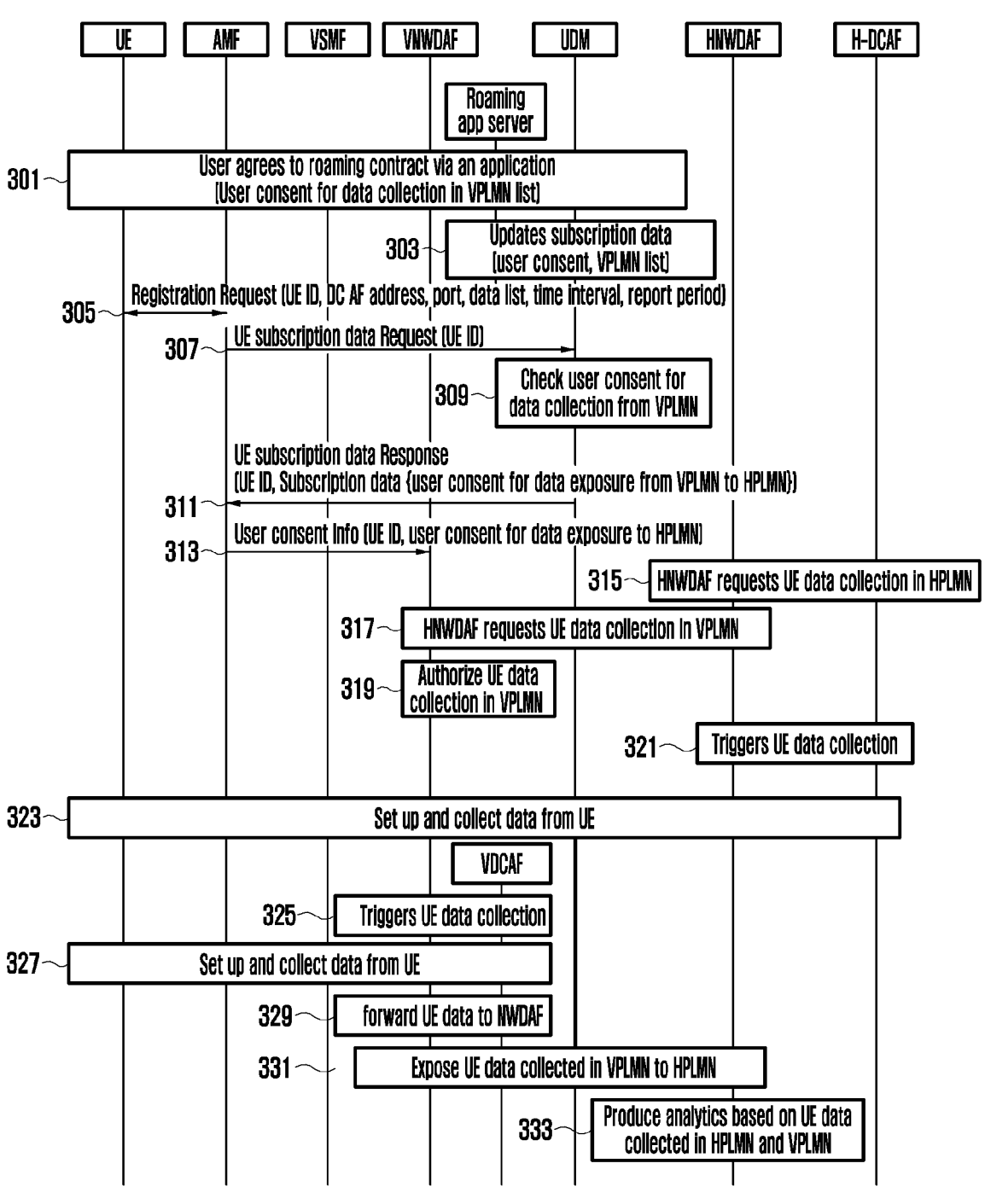
FIG. 3 illustrates a signal procedure of the wireless communication system for processing user consent to data collection and provision for a roaming UE according to another embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. In addition, in the description of the present disclosure, the specific descriptions of related well-known functions or configurations will be omitted when it is determined that the specific descriptions may unnecessarily obscure the subject matter of the present disclosure. Further, the terms used herein are defined considering the functions in the present disclosure and may vary depending on the intention or usual practice of a user or an operator. Therefore, the definition of the present disclosure should be made based on the entire contents of the present specification. Similarly, in the accompanying drawings, some constituent elements are illustrated in an exaggerated or schematic form or are omitted. In addition, a size of each constituent element does not entirely reflect an actual size. Like reference numerals designate like or corresponding elements in the drawings. Advantages and features of the technical spirit according to the present disclosure and methods of achieving the advantages and features will be clear with reference to exemplary embodiments described in detail below together with the accompanying drawings. However, the present disclosure is not limited to the exemplary embodiments disclosed herein but will be implemented in various different forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Throughout the specification, the same reference numerals denote the same constituent elements. In addition, in the description of the present disclosure, the specific descriptions of related well-known functions or configurations will be omitted when it is determined that the specific descriptions may unnecessarily obscure the subject matter of the technical spirit according to the present disclosure. In addition, the terms used herein are defined considering the functions in the present disclosure and may vary depending on the intention or usual practice of a user or an operator. Therefore, the definition of the present disclosure should be made based on the entire contents of the present specification.

Hereinafter, a base station is a subject that performs resource allocation of a UE and may be at least one of gNode B, eNode B, Node B, base station (BS), radio access unit, base station controller, or a node on a network. Examples of a terminal may include a user equipment (UE), a mobile station (MS), a cellular phone, a smartphone, a computer, and a multimedia system capable of performing a communication function. In the present disclosure, a downlink (DL) is a radio transmission path of a signal transmitted from the base station to the UE, and an uplink (UL) is a radio transmission path of a signal transmitted from the UE to the base station. In addition, although a Long-Term Evolution (LTE) or LTE-Advanced (LTE-A) system may be described below as an example, the embodiments of the present disclosure may be applicable to other communication systems having a similar technical background or channel form. For example, a system, to which the embodiment of the present disclosure may be applied, may include a 5G mobile communication technology (5G, New Radio, NR) developed after LTE-A. Hereinafter, the 5G may be a concept including existing LTE, LTE-A, and similar other services. In addition, based on the judgment of those skilled in the art, the present disclosure may be applicable to other communication systems through some modifications without greatly departing from the scope of the present disclosure. In this case, it will be understood that the respective blocks of processing flowcharts and combinations of the flowcharts may be performed by computer program instructions.

Because these computer program instructions may be embedded in a processor of a general-purpose computer, a special-purpose computer, or other programmable data processing apparatuses, the instructions executed through the processor of the computer or other programmable data processing apparatus generate means for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be mounted on the computer or other programmable data processing apparatus, the instructions for executing the computer or other programmable data processing apparatuses by generating a computer-implemented process by performing a series of operations on the computer or other programmable data processing apparatuses may provide steps of executing the functions described in the flowchart block(s).

In addition, each block may represent part of a module, segment, or code that includes one or more executable instructions for executing a specified logical function(s). In addition, it should also be noted that, in some alternative implementations, the functions described in the blocks may occur out of the order. For example, two blocks illustrated in succession may in fact be executed substantially concurrently, or the blocks may sometimes be executed in a reverse order, depending on the functions involved therein. The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module"

includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in the embodiments, the "module" or "-er/or" may include one or more processors.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Throughout the specification, the same reference numerals denote the same constituent elements.

Hereinafter, the present disclosure relates to a method and apparatus for supporting various services in a wireless communication system. Specifically, the present disclosure relates to a technology for supporting the improvement on performance of split computing by managing a request for communication session information received from a UE and an application server using the split computing in a in a wireless communication system and by providing necessary state information.

The terms used in the following description for identifying an access node, indicating a network entity or a network function (NF), indicating a message, indicating an interface between network entities, and indicating various pieces of identification information are taken as illustration for convenience of description. Therefore, the present disclosure is not limited by the terms to be described below, and other terms referring to objects having an equivalent technical meaning may be used.

Hereinafter, for convenience of description, the present disclosure uses terms and names defined in $3^{rd}$ generation partnership project (3GPP) long-term evolution (LTE) and 5G standards. However, the present disclosure is not limited by the above-mentioned terms and names, and may be equally applied to systems conforming to other standards.

Hereinafter, for convenience of description, the name of an NF (e.g., access and mobility management function (AMF), session management function (SMF), or network slice selection function (NSSF)) is used as an agent for exchanging information for access control and state management. However, the embodiments of the present disclosure may be equally applied even when the NF is actually implemented as an instance (e.g., AMF instance, SMF instance, or NSSF instance).

FIG. 1 illustrates a system structure of a 5GS according to the embodiment of the present disclosure. The 5GS may include a 5G core network, a base station, a UE, and the like. A 5G core network may include an AMF 120, an SMF 135, a UPF 130, a PCF 140, a UDM 145, an NSSF 160, an NWDAF 165, an N3F, and the like.

A UE 100 may access the 5G core network through a radio access network base station 110. The access network base station 110 may support a 3GPP access network type (e.g., NR, E-UTRA, etc.) or a non-3GPP access network type (e.g., WiFi, etc.). The UE 100 may be connected to the AMF 120 and an N2 interface through the base station 110 and connected to the UPF 130 and an N3 interface. The base station 110 may be referred to as another term having a technical meaning that is equivalent to that of a base station, such as an 'access point (AP),' 'eNodeB (eNB),' '5th generation node (5G node),' or 'gNodeB (gNB)', other than the term 'base station'. The N3F (non-3GPP function) is a network function (NF) that serves as terminations of the N2 interface and N3 interface for the UE 100 accessing via a non-3GPP access network that is not defined in 3GPP (e.g., Wi-Fi). The N3F may process N2 control plane signaling and N3 user plane packets.

The AMF (access and mobility management function) 120 is a network function (NF) for managing wireless network access and mobility of the UE. The SMF (session management function) 135 is an NF that manages a session for the UE, and the session information includes quality-of-service (QoS) information, charging information, and packet processing information. The UPF (user plane function) 130 is an NF that processes user traffic (e.g., user plane traffic) and is controlled by the SMF 135. The PCF 140 (policy control function) is an NF that manages operator policies for providing services in the wireless communication system. The UDM (user data management) 145 is an NF that stores and manages subscriber information (e.g., a UE subscription) of the UE. A unified data repository (UDR) is an NF that stores and manages data. The UDR may store UE subscription information and provide UE subscription information to the UDM. In addition, the UDR may store operator policy information and provide the operator policy information to the PCF. The NWDAF (network data analytics function) 165 is an NF that provides analysis information for operating the 5G system. The NWDAF may collect data from other NFs or operations, administration, and maintenance (OAM) constituting the 5G system, analyze the collected data, and provide the analytical results to other NFs. A network slice admission control function (NSACF) 180 is an NF that monitors and controls the number of registered UEs and the number of sessions of a network slice that is a target of network slice admission control (NSAC). The NSACF stores configuration information on the maximum number of registered UEs and the maximum number of sessions for each network slice.

Hereinafter, for convenience of description, entities that exchange information for access control and state management will be collectively described as an NF. However, the embodiments of the present disclosure may be equally applied even when the NF is actually implemented as an instance (e.g., AMF instance, SMF instance, or NSSF instance).

In the present disclosure, an instance may mean a state in which a specific NF exists in the form of software code and can be executed on a physical computing system, e.g., a specific computing system existing on the core network to perform the function of the NF by using physical or/and logical resources allocated from the computing system. Therefore, an NF instance, such as the AMF instance, the SMF instance, and the NS SF instance, may respectively use physical and/or logical resources allocated from a specific computing system existing on the core network for an AMF operation, an SMF operation, and an NSSF operation. As a result, the NF instance, such as the AMF instance, SMF instance, or NSSF instance, which uses physical or/and logical resources allocated from a specific computing system existing on the network for the AMF, SMF, or NSSF operation, may perform the same operation as when a physical NF entity such as an AMF, an SMF or an NSSF exists. Therefore, in the embodiment of the present disclosure, items described using NFs (e.g., an AMF, an SMF, a UPF, an NSSF, an NRF, or an SCP) may be replaced with items described using NF instances, or, conversely, items described using NF instances may be replaced items described using NFs. Likewise, in the embodiment of the present disclosure, items described using a network slice may be replaced with items described using a network slice instance, or, conversely, items described using a network slice instance may be replaced with items described using a network slice.

According to the embodiment of the present disclosure, in the 5G system defined by 3GPP, one network slice may be referred to as single-network slice selection assistance information (S-NSSAI). The S-NSSAI may include a slice/service type (SST) value and a slice differentiator (SD) value. The SST may indicate the characteristic of a service supported by the slice (e.g., eMBB, Internet of things (IoT), URLLC, or V2X). The SD may be a value used as an additional identifier for a specific service indicated by the SST.

The NSSAI may include one or more S-NSSAIs. Examples of NSSAI may include, but are not limited to, configured NSSAI stored in the UE, requested NSSAI requested by the UE, allowed NSSAI allowed to be used by the UE and determined by an NF (e.g., an AMF, an NSSF, etc.) of the 5G core network, and subscribed NSSAI to which the UE is subscribed.

The UE 100 may be simultaneously connected to the access network 110 and registered in the 5G system. Specifically, the UE 100 may access the base station 110 and perform a UE registration procedure with the AMF 120. During the registration procedure, the AMF 120 may determine an allowed slice (e.g., allowed NSSAI) available to the UE connected to the base station 110 and allocate the allowed slice to the UE 100. The UE may select a specific slice to configure a PDU session for communication with an actual application server. One PDU session may include one or a plurality of QoS flows, and each of the QoS flows may provide different transmission performances used for individual application services by configuring different QoS parameters.

Figure 2:
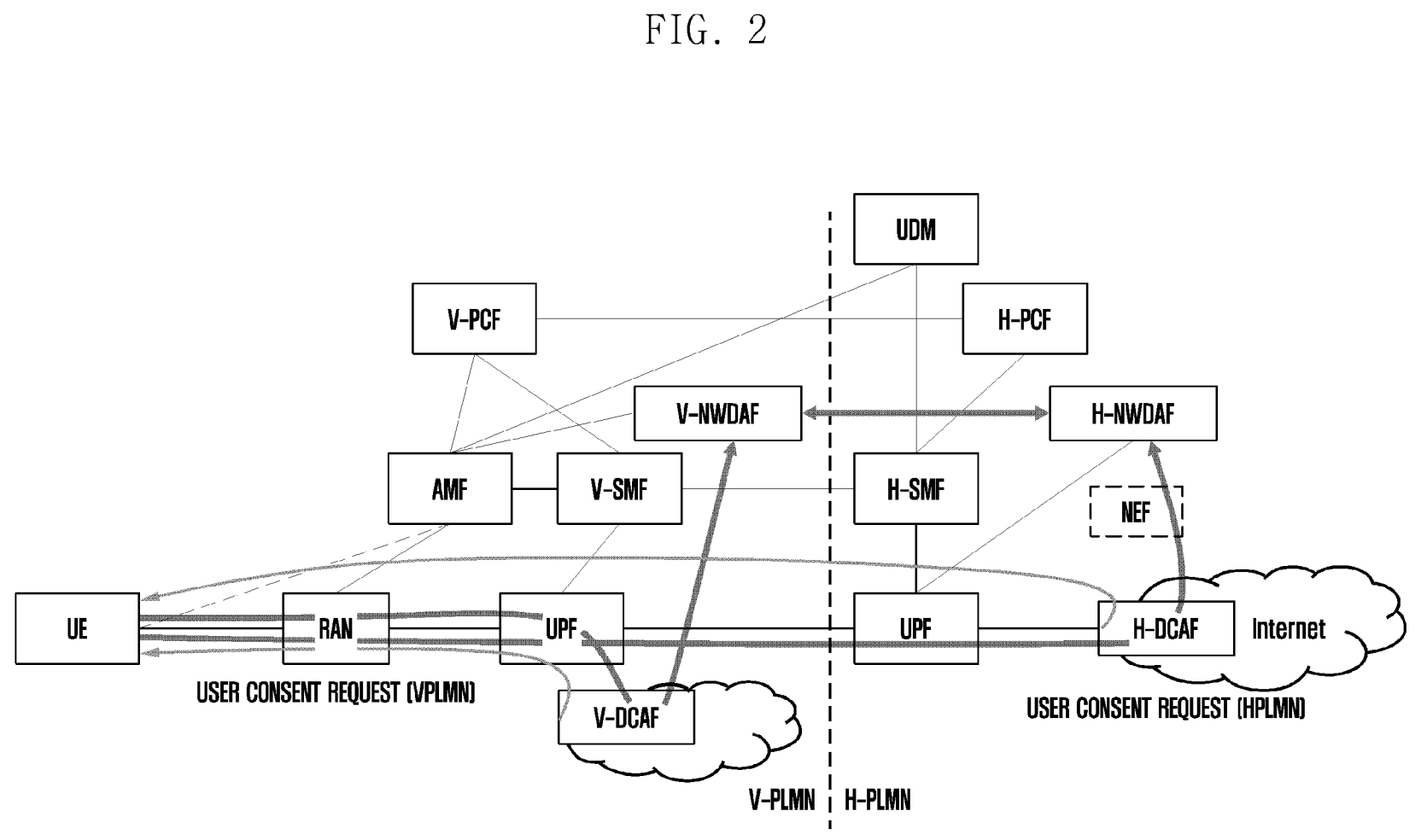

FIG. 2 illustrates a schematic operation of the wireless communication system for processing user consent to data collection and provision for a roaming UE according to the embodiment of the present disclosure.

A schematic operation of the proposed embodiment will be described with reference to FIG. 2. The UE may depart from a home operator network (home-public land mobile network (H-PLMN)) and access another operator network (visited-PLMN, V-PLMN) that has a contract with a home operator. The UE may perform an initial access process to use a communication service through the corresponding network. During a registration procedure for the initial access, the AMF may receive a registration request message from the UE, identify home network information of the UE from subscriber identifier information included in the registration request message, identify whether service subscription is made on the UDM of the home network and the UE, which has transmitted the registration request, and perform an authentication procedure. That is, the UDM of the H-PLMN may identify whether the service subscription is made on the V-PLMN (or the AMF of V-PLMN) and the UE, which has transmitted the registration request, and perform the authentication procedure. In case that all the authentication procedures are successfully performed, the AMF may receive subscriber information from the UDM. The subscriber information may include information on user consent to the user data collection through the UE by the subscriber, the data collection for the corresponding user UE in the home network, and the use of the collected data in the home network. That is, in case that all the authentication procedures are successfully performed, the UDM may provide the subscriber information to the AMF (or the V-PLMN), and the subscriber information may include information on the user consent to the user data collection through the UE by the subscriber, the data collection for the corresponding user UE in the home network, and the use of the collected data in the home network. In addition, in case that the subscriber has a contract with the home network operator for the network roaming, the subscriber information, which is transferred from the home network to the AMF (or the V-PLMN), may include information on the data collection and use in the network for roaming through a roaming contract process and information on whether the consent is given to provide the home network operator with the data collected in the roaming network. The AMF may transfer the user consent information, which is included in the subscriber information, to the V-NWDAF of the roaming network. The UE may complete the registration procedure for the initial access and perform a PDU session configuration procedure used to transmit the user data. The H-NWDAF of the home network may receive a request related to a network data analysis from any NF existing in the home network. The H-NWDAF, which has received the request, may collect data, which are used for analysis, from each of the NFs in the home network, and collect the data from the UE. In addition, the H-NWDAF may request the collection of data with the V-PLMN on which the roaming is performed by the UE (or request a result of analyzing the collected data). The H-NWDAF may request the data collection for the UE with the V-NWDAF through a direct or indirect path. The V-NWDAF, which has received the collection request from the H-NWDAF, may identify whether the data collection is allowed in the roaming network for the UE with reference to user consent information received from the AMF, and identify whether the data collected in the roaming network (or the analytical result from the collected data) may be provided to the home network. The V-NWDAF may determine whether to allow the request of the H-NWDAF. In addition, from the user consent information received from the AMF, the V-NWDAF may judge whether the UE may use the collected data in the roaming network. When the use of the collected data is allowed, it is possible to transmit a message for requesting data collection to the UE. In the opposite case, in case that the V-NWDAF intends to receive the data collected for the UE from the home network, the V-NWDAF may perform a similar process to identify whether the user consent is given from the H-NWDAF and to receive the data collected in the home network through the H-NWDAF in response to the consent result. According to the present disclosure, the NWDAF of the home and roaming network may use the user consent information stored in the UDM without a separate additional consent procedure and determine whether the user data collection is allowed in each of the networks and whether the user consent is given in respect to the provision of data between the networks. Therefore, from the user's perspective, the advantage is that the consent process for home and roaming networks and data collection may be unified and efficiently handled instead of being repeated multiple times.

FIG. 3 illustrates a signal procedure of the wireless communication system for processing user consent to data collection and provision for a roaming UE according to the embodiment of the present disclosure.

In step 1 (301), before moving to the roaming network, the UE may perform a process of entering into a contract with the home network operator in respect to the provision of the service during the roaming. For example, before departing for a roaming area, the UE user, in an airport or railroad station, may enter into a contract with the home network operator to provide a roaming service for a predetermined period of time at a separate fee, for example, through a separate application provided by the home network operator. The contract contents may include information on user consent to collection of the data of the user and the UE in the network for the UE in roaming. That is, the UE may provide the H-PLMN with the information on the user consent to the collection of the data of the user and the UE in the network (e.g., the V-PLMN) for the UE in roaming. That is, the user consent information may include whether the consent is given to collect data related to a state and service usage history of the user and the UE in the home network for the UE in roaming, whether the consent is given to collect data related to a state and service usage history of the user and the UE in the roaming network for the UE in roaming, whether the consent is given to provide the roaming network with the data collected (or analyzed) in the home network for the UE in roaming, and whether the consent is given to provide the home network with the data collected (or analyzed) in the roaming network for the UE in roaming. In addition, depending on the implementation, each of the consent processes may include a procedure of distinguishing the types of respective data, identifying whether the consent is given, storing and managing, as separate information, whether the consent is given instead of identifying whether the consent is given in a uniform manner in respect to the collection of all the types of data. In case that the roaming contract covers multiple roaming networks in the corresponding region, the user consent may be transferred by selecting a roaming network list to consent to the data collection for the duration of the roaming contract, and the type of data allowed to be collected for each of the roaming networks may be selectively designated.

In step 2 (303), the roaming application server may provide the UDM with the contents of the consent to the data collection made by the user for each of the roaming networks during the roaming contract process, and the UDM may store the received user consent information as a part of the user's subscription information. That is, the H-PLMN may acquire the user consent information from the UE.

In step 3 (305), the UE may move to the roaming network (e.g., the V-PLMN) and perform a registration procedure for the initial access. The UE may transmit a registration request message for the initial access to the AMF of the roaming network. The registration request message may include an identifier of the UE, and the AMF may determine the home network to which the UE is subscribed from the identifier of the UE.

In step 4 (307), the AMF may request authentication information of the UE and subscriber information from the home network of the UE. Although not illustrated, the authentication process of the UE may include multiple iterations of sending and receiving messages.

In step 5 (309), as a part of the stored subscriber information, the UDM, which has received the request of the AMF, may perform a process of identifying whether there is information on the user consent to the data collection and the transfer of information to the home network for the roaming network to which the AMF belongs. That is, the UDM of the H-PLMN may identify whether there is information that the UE has consented to the data collection and the transfer of information to the H-PLMN for the V-PLMN.

In step 6 (311), the UDM may transmit a response message to the user information request to the AMF. The response message may include the UE identifier and corresponding subscriber information. In addition, the subscriber information may include user consent information including whether the user consent is given to the data collection in the roaming network and whether the user consent is given to the forwarding of user data, which have been collected or analyzed in the roaming network, to the home network.

In step 7 (313), the AMF may select the user consent information from the received subscriber information and transfer the user consent information to the V-NWDAF of the roaming network.

In step 8 (315), the H-NWDAF of the home network may receive the request for the collection and analysis of network (e.g., H-PLMN and V-PLMN) data for the UE from the network function (NF) or the like of the home network, and the H-NWDAF may request the collection of network data used for the network functions (NFs) of the home network, the V-NWDAF of V-PLMN, and the like to collect data used for the requested data analysis.

In step 9 (317), the H-NWDAF (e.g., the H-PLMN) may request the data collection in the roaming network (e.g., the V-PLMN) through the V-NWDAF and the like.

In step 10 (319), the V-NWDAF, which has received the request for the data collection from the H-NWDAF, may identify whether the user consent is given to the forwarding of the data collected in the roaming network to the H-NWDAF from the user consent information received from the AMF in step 7.

In step 11 (321), the H-NWDAF may perform a process of requesting, from the UDM, the information on user consent to the user data collection from the user UE and identifying whether the user consent is given. In case that the user consent is given, the H-NWDAF may transmit a message for requesting data collection to a home-data collection application function (H-DCAF) in order to collect data from the user UE.

In step 12 (323), the H-DCAF may configure a transmission path for data collection with the UE through the application message and collect data from the UE.

In step 13 (325), the V-NWDAF refers to the user consent information received from the AMF to identify whether the user consent is given to the user data collection from the UE in the roaming network, and the V-NWDAF may request the data collection of the UE from the V-DCAF in the roaming network for the data collection requested from the H-NWDAF.

In step 14 (327), the V-DCAF may configure a transmission path for data collection with the UE through the application message and collect data from the UE.

In step 15 (329), the V-DCAF may forward the data of the user and the UE received from the UE to the V-NWDAF.

In step 16 (331), the V-NWDAF may forward data collected in the roaming network (or data made by analyzing the collected data) to the H-NWDAF of the home network.

In step 17 (333), the H-NWDAF may aggregate the data collected in the home network and the data collected in the roaming network through the V-NWDAF to produce analytical result and transfer the analytical result to the network function that has requested the analysis.

Figure 4:
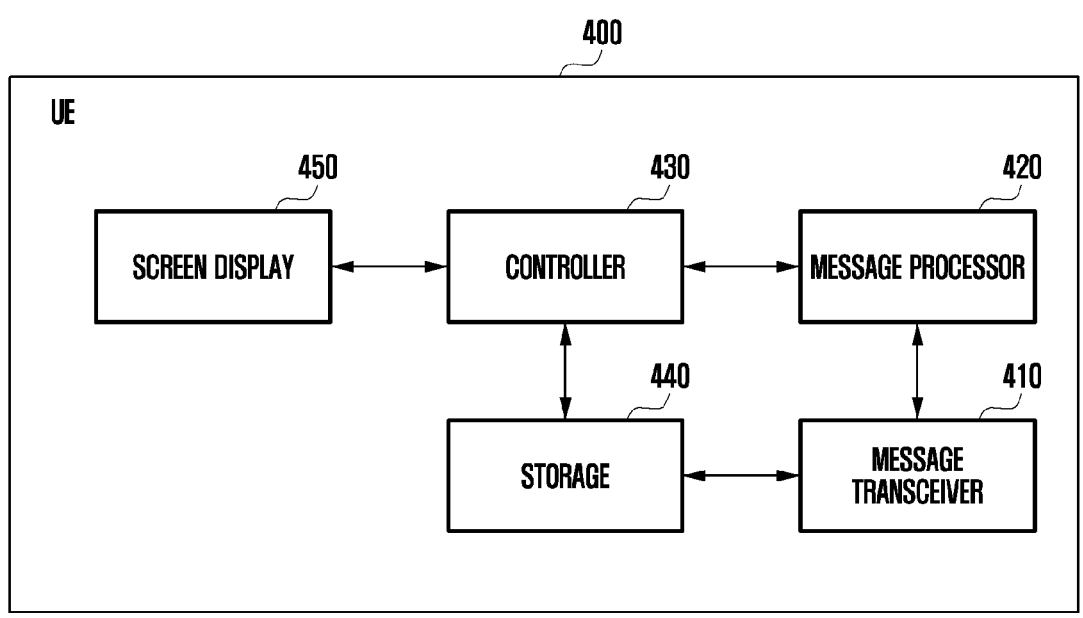
FIG. 4 illustrates an internal structure of a UE in a wireless communication system according to the embodiment of the present disclosure.

FIG. 4 illustrates an internal structure of the UE in the wireless communication system according to the embodiment of the present disclosure.

With reference to FIG. 4, a UE 400 includes a transceiver 410, a message processor 420, a controller 430, a storage 440, and a screen display 450. However, the constituent elements of the UE 400 are not limited to the above-mentioned example. For example, the base station may include more or fewer constituent elements than the above-mentioned constituent elements. Furthermore, at least one component of the UE 400 may be implemented as a single chip. According to some embodiments, the transceiver 410 may perform a function for transmitting and receiving a signal through a wireless channel, such as band conversion and amplification of a signal. That is, the transceiver 410 may include an RF processor that up-converts a baseband signal into an RF band signal, transmits the RF band signal through an antenna, and down-converts an RF band signal received through the antenna into a baseband signal, and further include a transmission filter, a reception filter, an amplifier, a mixer, an oscillator, a digital to analog converter (DAC), and an analog to digital converter (ADC).

Further, the transceiver 410 may receive a signal through a wireless channel, output the signal to the processor 430, and transmit the signal output from the processor 430 through a wireless channel. The transceiver 410 may perform beamforming. For beamforming, the transceiver 410 may adjust a phase and magnitude of each of signals transmitted and received through a plurality of antennas or antenna elements. Further, a baseband processor in the transceiver 410 may perform a conversion function between a baseband signal and a bit string according to a physical layer specification of a system. For example, when transmitting data, the baseband processor may encode and modulate a transmitted bit string, thereby generating complex symbols. Further, when receiving data, the baseband processor may demodulate and decode the baseband signal provided from the RF processor, thereby restoring a received bit string. For example, in the case of following an orthogonal frequency division multiplexing (OFDM) method, when transmitting data, the baseband processor may encode and modulate the transmission bit string to generate complex symbols, map the complex symbols to sub-carriers, and then constitute OFDM symbols through an inverse fast Fourier transform (IFFT) operation and cyclic prefix (CP) insertion.

Further, when receiving data, the baseband processor may divide the baseband signal provided from the RF processor into OFDM symbol units, restore signals mapped to sub-carriers through a fast Fourier transform (FFT) operation, and then restore the received bit string through demodulation and decoding.

The transceiver 410 may be defined as a transceiver and include a message transceiver. The message processor 420 may perform an operation of determining what kind of message data transmitted or received through the transceiver 410 is. For example, the message processor 420 may determine whether the received message is a radio resource control (RRC) layer control message (including a system information block (SIB)) or a user data message. The message processor 420 may be included in the controller 430.

The controller 430 controls overall operations of the UE 400. For example, the controller 430 may transmit and receive a signal through the message processor 420. Further, the controller 430 writes and reads data in the memory 440. The controller 430 may be at least one. For example, the controller 430 may include a communication processor (CP) that controls for communication and an application processor (AP) that controls an upper layer such as an application program. According to some embodiments, the controller 430 may judge whether to send a response to the network based on a paging message received through the message processor 420. In addition, according to some embodiments, the controller performs a reject cause process as a response message to the network access request so that the screen display 450 may display the process or process an additional operation by receiving the corresponding information.

The controller 430, the message processor 420, and the transceiver 410 may control the UE 400 to perform the access to a selected operator network based on the user or UE configuration. In addition, according to some embodiments, the controller 430 may perform a process of allowing the UE to infer information, which may be referenced for service selection, by matching data records read through the storage 440 or information collected by the controller 430, the message processor 420, and the transceiver 410.

The storage 440 stores data such as a basic program, an application program, configuration information for the operation of the UE 400. In an embodiment, the storage 440 may be configured with a storage medium such as a ROM, RAM, hard disk, CD-ROM, DVD, a secure element (hardware security module), and a SIM card or a combination of storage media. Further, the storage 440 may be integrated with the controller 430 and a system-on-chip (SoC).

A SIM card, which is an example of the storage, may include therein some or all the components in the module of the UE 400, except for the screen display 450. For example, the SIM card may include a may include a controllers that stores IMSI values, which are subscriber authentication information, and performs computation and encryption/decryption for generating keys and random values to perform mutual authentication between the network and the UE based on IMSI in the network.

The screen display 450 may display information treated/processed by the controller 430. Alternatively, the screen display 450 may display a progress of an operation performed by the UE 400 through the processing of the controller 430 or the user consent to an event requested to be performed by the user. According to one embodiment of the present disclosure, the screen display may configure a reason for blocking network access to a user as a result of the occurrence of a duplicate registration, and display the reason. Alternatively, the screen display may configure a screen to obtain user consent to allowance of a duplicate registration and a menu to obtain the user's input, and display the screen and menu.

Figure 5:
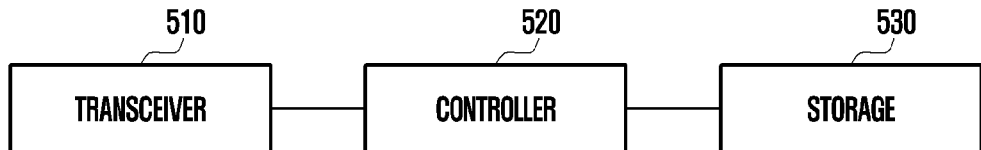
FIG. 5 illustrates a structure of a network entity that performs a network function according to the embodiment of the present disclosure.

FIG. 5 illustrates a structure of a network entity that performs a network function according to the embodiment of the present disclosure.

The network entity in FIG. 5 may be one of the RAN 110, the AMF 120, the SMF 135, the UPF 130, the PCF 140, the UDM 145, the NSSF 160, the NWDAF 165, the DN 175, and the NSACF 180 that have been described with reference to the embodiments of the present disclosure.

With reference to FIG. 5, the network entity for performing a network function may include a transceiver 510, a controller 520, and a storage 530. In the present disclosure, the controller may be defined as a circuit, an application specific integrated circuit (ASIC), or at least one processor.

The transceiver 510 may transmit and receive signals to and from other network entities. For example, the transceiver 510 may transmit and receive signals or messages to and from the AMF, i.e., the network entity that manages the access to the access network of the UE and manages the mobility.

The controller 520 may control overall operations of the network entity that performs the network functions according to the embodiments proposed in the present disclosure. For example, the controller 520 may control signal flows between the blocks to perform the operations according to the above-described flowcharts.

The storage 530 may store at least one of information transmitted and received through the transceiver 510 or information generated through the controller 520.

Meanwhile, the embodiments of the present disclosure disclosed in the present specification and illustrated in the drawings are provided as particular examples for easily explaining the technical contents the present disclosure and helping understand the present disclosure, but not intended to limit the scope of the present disclosure. It is obvious to those skilled in the art to which the present disclosure pertains that other modified embodiments may be carried out based on the technical spirit of the present disclosure. In addition, the respective embodiments may be combined with one another and operated, as necessary. For example, at least some parts of the embodiments of the present disclosure may be combined with one another and operated by the base station or the UE.

The UE according to various embodiments disclosed in the present document may be an electronic device, and the electronic device may be a device having various shapes. Examples of the electronic device may include a portable communication device (e.g., a smartphone), a computer device, a portable multimedia device, a portable medical device, a camera, a wearable device, or a home appliance. The electronic device according to the embodiment of the present document is not limited to the above-mentioned devices.

Various embodiments of the present document and the terms used in the embodiments are not intended to limit the technical features disclosed in the present document to the particular embodiments and should be understood as including various alterations, equivalents, or alternatives of the corresponding embodiments. In connection with the description of the drawings, the same or similar reference numerals may be used for the similar components. A singular form of a noun corresponding to an item may include one or more of the items, unless the relevant context clearly indicates otherwise. As used in the present document, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" used in the present document may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to the embodiment, the module may be implemented in a form of an application-specific integrated circuit (ASIC).

Various embodiments in the present document may be implemented as software (e.g., programs) including one or more instructions are stored in a storage medium (e.g., an internal memory or an external memory) readable by a machine (e.g., an electronic device). For example, a processor of the machine (e.g., the electronic device) may invoke at least one of the one or more instructions stored in the storage medium, and execute the at least one of the one or more instructions. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to the embodiment, a method according to various embodiments disclosed in the present document may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each constituent element (e.g., module or program), among the above-mentioned constituent elements, may include a single entity or a plurality of entities. According to various embodiments, one or more constituent elements, among the above-mentioned constituent elements, or operations may be omitted, or one or more other constituent elements or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or a plurality of operations may be executed in a different order or omitted, or one or more other operations may be added.

While the specific embodiments have been described in the detailed description of the present disclosure, various modifications may of course be made without departing from the scope of the present disclosure. Therefore, the scope of the present disclosure should not be limited to the described embodiments, and should be defined by not only the claims to be described below, but also those equivalent to the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a home-network data analytics function (H-NWDAF), the method comprising:
   receiving, from at least one network function (NF) in a home-public land mobile network (H-PLMN), an analysis data provision request of a user equipment (UE) roaming in a visited-PLMN (V-PLMN);
   requesting, to a visited-NWDAF (V-NWDAF), user data collection of the UE for data collection in the V-PLMN based on the analysis data provision request;
   requesting, to a user data management (UDM), user consent information from the UE associated with user data collection of the UE and transferring at least a portion of user data collected while the UE is roaming to another PLMN;
   identifying whether a user consent is given based on the user consent information from the UE;
   if the user consent is identified as having been given, transmitting, to a home-data collection application function (H-DCAF), a collection request message for user data of the UE from the UE roaming in the V-PLMN; and
   receiving, from the V-NWDAF, the user data of the UE collected in the V-PLMN.

2. The method of claim 1, further comprising:
   analyzing the user data of the UE collected in the H-PLMN and the user data of the UE collected in the V-PLMN; and
   transmitting a result of the analysis to the at least one NF belonging to the H-PLMN.

3. The method of claim 1, wherein the user consent information from the UE is provided to the UDM by a roaming application server.

4. The method of claim 1, wherein the user consent information from the UE includes at least one of:
   whether consent is given to data collection of a state and service usage history of the UE in the H-PLMN when the UE is in roaming,
   whether consent is given to data collection of a state and service usage history of the UE in the V-PLMN,
   whether consent is given to provision of the user data of the UE collected in the H-PLMN to the V-PLMN,
   whether consent is given to provision of the user data of the UE collected in the V-PLMN to the H-PLMN,
   whether consent is given to provision of the user data including an analyzed result of the user data of the UE collected in the H-PLMN to the V-PLMN,
   whether consent is given to provision of the user data including an analyzed result of the user data of the UE collected in the V-PLMN to the H-PLMN, and
   whether consent is given to data collection for each type of data and information on a roaming network list for consent to data collection.

5. A home-network data analytics function (H-NWDAF) comprising:
   a transceiver; and
   a controller,
   wherein the controller is configured to:
      receive, from at least one network function (NF) in a home-public land mobile network (H-PLMN), an analysis data provision request of a user equipment (UE) roaming in a visited-PLMN (V-PLMN);

request, to a visited-NWDAF (V-NWDAF), user data collection of the UE for data collection in the V-PLMN based on the analysis data provision request;

request, to a user data management (UDM), user consent information from the UE associated with user data collection of the UE and transfer at least a portion of user data collected while the UE is roaming to another PLMN;

identify whether a user consent is given based on the user consent information from the UE;

if the user consent is identified as having been given, transmit, to a home-data collection application function (H-DCAF), a collection request message for user data of the UE from the UE roaming in the V-PLMN; and receive, from the V-NWDAF, the user data of the UE collected in the V-PLMN.

6. The H-NWDAF of claim 5, wherein the controller is further configured to:

analyze the user data of the UE collected in the H-PLMN and the user data of the UE collected in the V-PLMN; and transmit a result of the analysis to the at least one NF belonging to the H-PLMN.

7. The H-NWDAF of claim 5, wherein the user consent information from the UE is provided to the UDM by a roaming application server.

8. The H-NWDAF of claim 5, wherein the user consent information from the UE includes at least one of:

whether consent is given to data collection of a state and service usage history of the UE in the H-PLMN when the UE is in roaming, whether consent is given to data collection of a state and service usage history of the UE in the V-PLMN, whether consent is given to provision of the user data of the UE collected in the H-PLMN to the V-PLMN, whether consent is given to provision of the user data of the UE collected in the V-PLMN to the H-PLMN, whether consent is given to provision of the user data including an analyzed result of the user data of the UE collected in the H-PLMN to the V-PLMN, whether consent is given to provision of the user data including an analyzed result of the user data of the UE collected in the V-PLMN to the H-PLMN, and whether consent is given to data collection for each type of data and information on a roaming network list for consent to data collection.

9. A method performed by a user data management (UDM), the method comprising:

receiving, from a user equipment (UE), user consent information associated with collection of user data of the UE roaming in a visited-public land mobile network (V-PLMN) and transferring at least a portion of user data collected while the UE is roaming to another PLMN;

receiving a subscriber information request for the UE from an access and mobility management function (AMF) of the V-PLMN;

identifying whether consent is given to collect user data of the UE and to transfer the collected user data from the V-PLMN to a home public land mobile network (H-PLMN) based on the user consent information;

transmitting, to the AMF, a response message including the subscriber information, wherein the subscriber information includes the identified consent to collect user data and to transfer the collected user data;

receiving a request for the user consent information from a home-network data analytics function (H-NWDAF); and transmitting the user consent information to the H-NWDAF.

10. The method of claim 9, wherein the user consent information includes information on whether consent is given to data collection for each type of data and information on a roaming network list for consent to data collection.

11. The method of claim 9, wherein the user consent information includes at least one of whether consent is given to data collection of a state and service usage history of the UE in a home-PLMN (H-PLMN) when the UE is in roaming, whether consent is given to data collection of a state and service usage history of the UE in the V-PLMN, whether consent is given to provision of the user data of the UE collected in the H-PLMN to the V-PLMN, whether consent is given to provision of the user data of the UE collected in the V-PLMN to the H-PLMN, whether consent is given to provision of the user data including an analyzed result of the user data of the UE collected in the H-PLMN to the V-PLMN, and whether consent is given to provision of the user data including an analyzed result of the user data of the UE collected in the V-PLMN to the H-PLMN.

12. A user data management (UDM) comprising:

a transceiver; and a controller, wherein the controller is configured to:

receive, from a user equipment (UE), user consent information associated with collection of user data of the UE roaming in a visited-public land mobile network (V-PLMN) and transfer at least a portion of user data collected while the UE is roaming to another PLMN;

receive a subscriber information request for the UE from an access and mobility management function (AMF) of the V-PLMN;

identify whether consent is given to collect user data of the UE and to transfer the collected user data from the V-PLMN to a home public land mobile network (H-PLMN) based on the user consent information;

transmit, to the AMF, a response message including the subscriber information, wherein the subscriber information includes the identified consent to collect user data and to transfer the collected user data;

receive a request for the user consent information from a home-network data analytics function (H-NWDAF); and transmit the user consent information to the H-NWDAF.

13. The UDM of claim 12, wherein the user consent information includes information on whether consent is given to data collection for each type of data and information on a roaming network list for consent to data collection.

14. The UDM of claim 12, wherein the user consent information includes at least one of:

whether consent is given to data collection of a state and service usage history of the UE in a home-PLMN (H-PLMN) when the UE is in roaming, whether consent is given to data collection of a state and service usage history of the UE in the V-PLMN, whether consent is given to provision of the user data of the UE collected in the H-PLMN to the V-PLMN, whether consent is given to provision of the user data of the UE collected in the V-PLMN to the H-PLMN,

whether consent is given to provision of the user data
    including an analyzed result of the user data of the UE
    collected in the H-PLMN to the V-PLMN, and
whether consent is given to provision of the user data of
    the UE including an analyzed result of the user data of
    the UE collected in the V-PLMN to the H-PLMN.

* * * * *